Aug. 9, 1960 T. G. KLINK 2,948,435
CONTAINER FEED APPARATUS
Filed June 17, 1958 3 Sheets-Sheet 1

INVENTOR.
THEODORE GEORGE KLINK
BY
James V McDonald
AGENT.

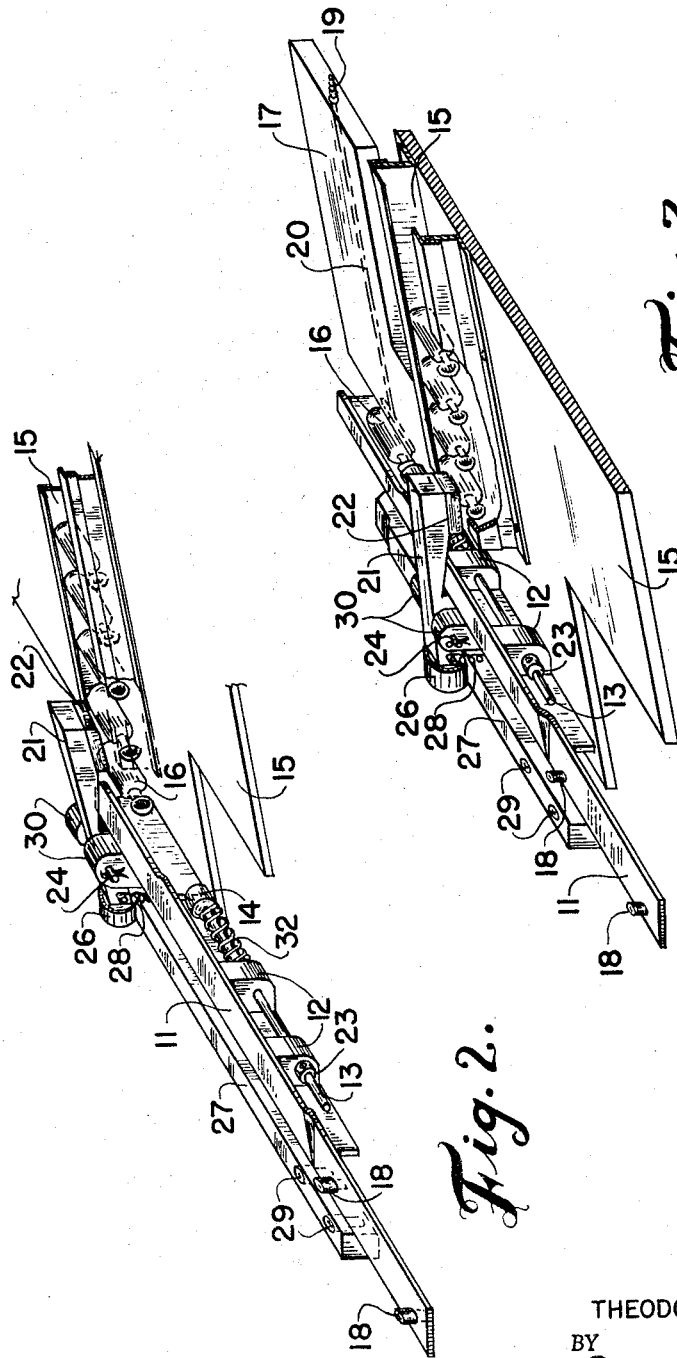

Aug. 9, 1960 T. G. KLINK 2,948,435
CONTAINER FEED APPARATUS
Filed June 17, 1958 3 Sheets-Sheet 3
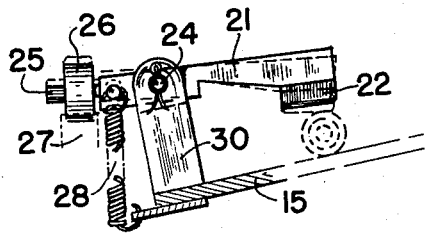
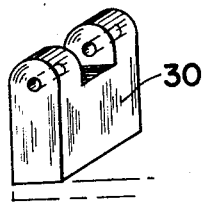
*Fig. 4.*     *Fig. 5.*
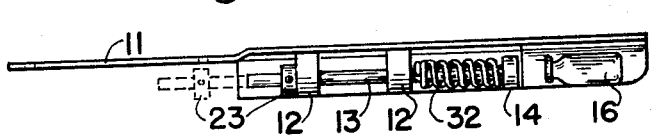
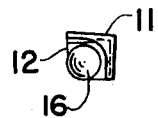
*Fig. 6.*     *Fig. 7.*
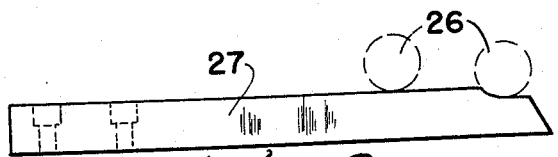
*Fig. 8.*     *Fig. 9.*
*Fig. 10.*
INVENTOR.
THEODORE GEORGE KLINK
BY
James V. McDonald
AGENT.

United States Patent Office 2,948,435
Patented Aug. 9, 1960

2,948,435

CONTAINER FEED APPARATUS

Theodore George Klink, Spring Valley, N.Y., assignor to American Cyanamid Company, New York, N.Y., a corporation of Maine Filed June 17, 1958, Ser. No. 742,552

6 Claims. (Cl. 221—251)

This invention relates to a container feeding apparatus for feeding containers such as bottles, vials, ampoules and the like, individually under controlled feed conditions from a side by side relationship in a gravity chute to a processing station. More particularly, it relates to the rapid feeding of small light containers.

One general type of container feed apparatus, usable with a large number of container processing units such as labeling machines, washing machines and so forth, incorporates a gravity chute which acts as a supply station for the containers, the chute discharging a container from its lower end onto an uncovered stationary pathway, whereupon a reciprocating pusher rod on its forward stroke shoves the container along the pathway to the processing station, while simultaneously, by sliding contact therewith, preventing the next container in the chute from dropping onto the pathway until the return stroke of the reciprocating pusher rod is complete.

Although such a container feed apparatus is usually designed to operate over a wide range of speeds, operational difficulties frequently occur while its is positioning very tiny containers, for example, 2 cubic centimeter pharmaceutical vials, at high speeds. In the first place, a tiny container while being propelled at high speed by the reciprocating pusher rod may literally bounce off of the pathway enroute to the processing station. Secondly, during its return stroke the reciprocating pusher rod, instead of merely retaining the adjacent container in readiness for discharge from the chute, may actually dislocate it sufficiently so that as a result the chute may become jammed and thereby necessitate shutting down the whole processing operation.

It has now been found that these high speed operational difficulties associated with the aforesaid type prior art container feed apparatus may be overcome by incorporating thereon two novel features.

One of the aforesaid novel features is a guide member which is attached to the reciprocating pusher rod assembly, and moves in conjunction with it. The guide member is attached in parallel spaced relationship to the reciprocating pusher rod and forms an overhanging shelter or guide over the entire length of the pusher rod and forward thereof, the forward extension being of sufficient length to prevent any container from escaping from its pathway in front of the pusher arm during its forward stroke. This overhanging shelter provided by the guide member provides for controlled high speed transfer of small light weight containers which otherwise show a tendency to jump from the pathway in uncontrolled fashion due to the impetus of the reciprocating pusher arm, rather than to move in orderly fashion along the pathway to the processing station.

The other of the two aforesaid novel features is a retention arm-retention cam combination. A retention arm is pivotably mounted on a suitable support, which retention arm support is positioned at a point on the other side of the uncovered pathway from the bottom of the gravity chute and at an appreciably higher level than the pathway. While at normal rest position, the retention arm is positioned substantially in a plane parallel to and above the plane of the uncovered pathway and is at right angles to the pathway. One end of the retention arm extends over the lower extremity of the gravity chute. The other end of the retention arm is in constant substantially right-angle contact with a retention cam, which is a long tapered member attached to the reciprocating pusher rod assembly and which is parallel to the pusher rod itself. When activated by the retention cam, the retention arm pivots, dropping one end into the open chute and thereby retaining the next container in the chute in its original position in the chute until the backward stroke of the reciprocating pusher arm is complete.

Other novel features will become apparent from the discussion in the succeeding paragraphs.

While it is to be understood that my invention is not limited thereto, a specific embodiment is illustrated in the drawings in which:

Figure 2 is a different perspective of the essential operating elements in their same relative positions as in Figure 1.

Figure 3 shows the reciprocating pusher arm as the forward stroke is completed, and the container moved into the processing area, and the retention arm in contact with the next container up the chute.

Figure 4 shows an elevation view of the retention arm assembly.

Figure 5 is a perspective view of the retention arm support block.

Figure 6 is an elevation showing the reciprocating drive rod with the L-shaped guide member attached thereto.

Figure 7 is a right end view of the assembly shown in Figure 6.

Figures 8, 9 and 10 are, respectively, an elevation, an end view and a plan view of the retention cam shown in two positions of contact with the retention arm roller.

Figure 1:
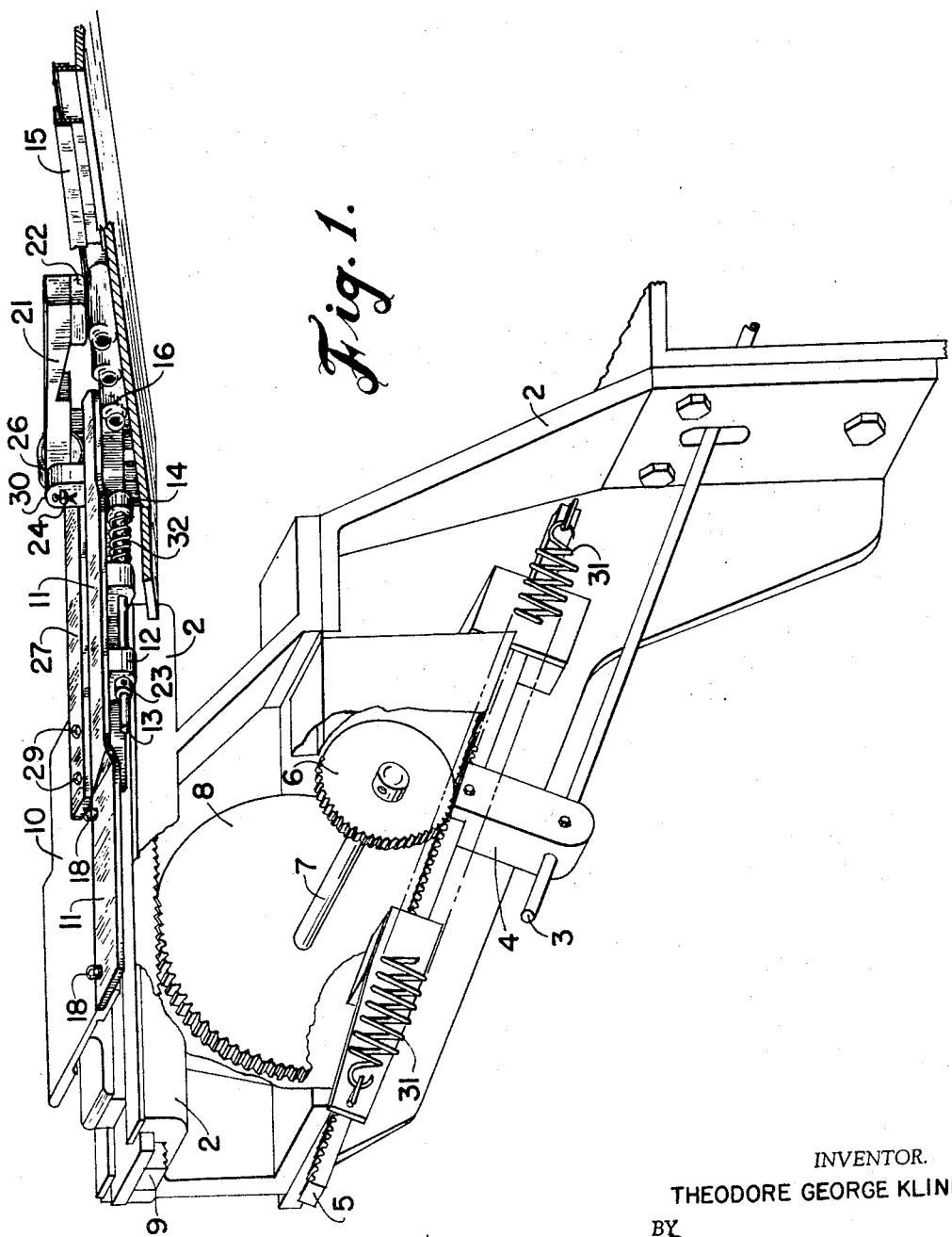
Figure 1 is a perspective view partly in section of my improved container feed apparatus, showing the reciprocating pusher rod about to begin its forward stroke, a container in the pathway at the foot of the chute and in readiness for contact with the reciprocating pusher rod, and the retention arm free from contact with the next container up the chute.

The frame 1 acts as support for the drive and chute support 2; also as support for a conventional processing station which is not shown and also as a support for an actuating means, not shown, for the reciprocating drive rod 3, the means, for example, being an eccentric cam system. The connecting block 4 connects the reciprocating drive rod 3 with the pinion rack 5 which is subject to tension from the pinion rack return spring 31. The pinion 6 engages and is driven by the pinion rack 5. The pinion 6 is affixed to the pinion shaft 7. The drive gear 8 is also mounted on the pinion shaft 7, and is in meshing contact with the drive rack 9. The upper flanged portion of the drive rack 9 is slidably supported by the drive and chute support 2. The drive rack 9 can slide back and forth in the slotted portion of the drive and chute support 2. Atop and attached to the drive rack 9 is reciprocable table 10. An L-shaped guide member 11 is bolted at its flat extremity to the reciprocable table 10 by means of guide member bolts 18. Pusher rod supports 12 are attached to the under-surface of the L-shaped guide member 11 and slidably support a reciprocating pusher rod 13. A contact button 14 is located at the end of the reciprocating pusher rod 13. The contact button 14 is of resilient material and is a collar for the reciprocating pusher rod 13. A contact button spring 32 urges the reciprocating pusher rod forward, and the rod slides forward until a stop 23 on the pusher rod rests against one of the pusher rod supports 12.

The gravity chute 15 is an inclined plate having two guide members attached to it and defining a repository area for containers. The gravity chute 15 is attached to the drive and chute support 2 by removable bolts not shown and, in turn, has attached thereto retention arm support block 30. Retention arm 21 is pivotably supported by the retention arm support block 30 with a retention arm retaining pin 24 acting as the pivot means. To the bottom surface of the end of the retention arm 21 that extends over the lower extremity of the chute 15 is attached a resilient friction pad 22. The pad 22 is preferably constructed of ordinary type sponge rubber, although the use of other resilient-friction type materials for this purpose is not precluded, for instance, soft leather, various synthetic polymeric materials and so forth. Bolted to the other end of the retention arm 21, opposite the end carrying the resilient friction pad 22, is a roller retaining bolt 25. This bolt 25 carries the retention arm roller 26 which can freely rotate on the shaft of the bolt 25. The retention arm roller 26 is so positioned that it remains in constant rolling contact with the retention cam 27. This rolling contact is assured by virtue of a release spring 28, the lower end of which is attached to the drive and chute support 2 near the base of support block 30 and the upper end of which is attached to the end of the retention arm 21 that carries the retention arm roller 26. Retention cam 27 is attached to reciprocable table 10 by means of a pair of retention cam bolts 29. A processing area station 17 is shown in the drawings as a relatively thick plate having an uninterrupted top surface except for a plurality of holes, not shown, which are vacuum outlets and which are located directly in the pathway of the oncoming container 16. Vacuum is applied to the processing area station 17 at a vacuum nozzle 19 which is located on the end of the station 17, the vacuum source in this case not being shown. The vacuum source is usually designed to be applied intermittently rather than continuously and is timed in close working cooperation with the action of reciprocating pusher rod 13. The vacuum nozzle 19 opens into a hollow chamber, not shown, within the station 17. The hollow chamber is connected to the plurality of vacuum outlets mentioned above by means of a plurality of passageways 20, only one of which is shown.

In the ordinary operation of my improved container feed apparatus, the gravity chute 15 is kept filled to capacity with containers in side by side relationship. When the reciprocating pusher rod 13 is about to begin its forward stroke, the gravity chute 15 discharges a container 16. The retention arm support block 30 stops the fall of the container 16 and, aided by the degree of inclination of the base of the gravity chute 15, cradles the container 16 in the pathway of the about-to-be-activated reciprocating pusher rod 13, with the top of the container facing the direction from which the reciprocating pusher rod 13 will approach. The forward stroke of the reciprocating pusher rod 13 begins when the reciprocating drive rod 3 is actuated. The reciprocating drive rod 3 drives the pinion rack 5 through the connecting block 4. The pinion rack 5 drives the pinion 6. The pinion 6 drives the pinion shaft 7. The pinion shaft 7 drives the drive gear 8. The drive gear 8 drives the drive rack 9. The drive rack 9 drives the reciprocable table 10 which in turn drives the L-shaped guide member 11. The L-shaped guide member 11 drives the reciprocating pusher rod 13 through the pusher rod supports 12. The reciprocable table 10 simultaneously drives the retention cam 27.

During the forward stroke, the contact button 14 of the reciprocating pusher rod 13 approaches and contacts the container-in-readiness, the container 16, at a position below the bottom of the gravity chute 15. The contact is "soft" by virtue of the action of the contact button spring 32. After contact is effected, the reciprocating pusher rod 13 through the medium of the contact button 14 begins to push the container 16 along the pathway. During this stage the movement of the container 16 is further controlled by the sheltering action of the L-shaped guide member 11. Finally, at the end of the forward stroke the container 16 is delivered to the processing area station 17 where it is held in readiness for whatever processing operation is desired, e.g., labeling, washing, filling, decorating, stamping with identification code numbers, and so forth. Also on the forward stroke, the retention cam 27 simultaneously moves forward in constant rolling contact with the retention arm roller 26, gradually raises the roller 26 as the forward stroke commences. The roller 26 in being raised, causes the retention arm 21 to pivot on the roller retaining bolt 25 which in turn causes resilient friction pad 22 to drop and thereby gradually engage and retain the so-called "second" container in the chute 15 and free from slidable contact with the reciprocating pusher rod 13.

On the backward stroke the contact button 14 of the reciprocating pusher rod 13 starts coming back toward the base of the gravity chute 15, reaches the base of the chute 15 and finally moves on back beyond the base until the backward stroke is completed. Meanwhile the retention cam 27 moves backward, gradually lowers roller 26 which, in turn, means gradual pivoting of the retention arm 21, gradual raising of the resilient friction pad 22 and, finally, release of the following or "second" container.

The retention cam 27 is so-tapered as to cause the resilient friction pad 22 to (1) engage the following container as soon as practicable after the first container has been pushed away from its position on the pathway at the foot of the chute 15 and (2) release the following container only after the contact button 14 has passed by and beyond the base of the chute on the return stroke.

While the improved container feed apparatus of my invention is particularly advantageous for use with tiny light weight containers of varying diameter, it is also very useful in feeding what will be known to those skilled in the art as "normal" diameter type containers. In other words, my improved container feed apparatus is adaptable to containers varying widely in diameter. This adaptability is realized by merely changing the degree of taper of the retention cam 27. As the taper is varied, the extent to which the retention arm roller 26 is raised and lowered varies proportionally as, consequently, does the extent to which the retention arm 21 pivots and, finally, as does the extent to which the resilient friction pad 22 is raised and lowered.

For practical purposes, one way to change the taper of the retention cam 27 is to simply unbolt the cam 27 from the reciprocable table 10 and replace it with a stand-by retention cam 27 of appropriately different taper. This method has much merit but does require a certain amount of adjusting to be done not only on the retention arm-retention cam assembly, but also on the pusher rod assembly. A more preferable method is what may be termed a "composite integral unit change," a change which involves substituting a different (1) gravity chute assembly, (2) a complete retention arm-retention cam assembly and (3) a complete reciprocating pusher rod assembly. More specifically, as a "composite integral unit" the following items are replaced: the gravity chute 15 with the retention arm support block 30 attached thereto, the retention cam 27, the retention arm roller 26, the roller retaining bolt 25, the retention arm retaining pin 24, the resilient friction pad 22, the L-shaped guide member 11, the pusher rod supports 12, the reciprocating pusher rod 13, the contact button 14 and the contact button spring 32. In other words, for each container of a particular diameter and height there may be held in stand-by readiness a "composite integral unit" particularly adapted to handle that particular container. The "composite integral unit change" feature is to be considered as a novel aspect of my invention.

One of the many advantages associated with the "composite integral unit change" as opposed to an "individual element change", an example of the latter being where the retention cam 27 would be the only part replaced with a stand-by part, is that (1) the need for fine adjustments to various parts of the apparatus is eliminated and (2) the need for trial runs to see if adjustments have actually been properly made, is also eliminated. These are important eliminations because the time of conversion, downtime, is materially reduced. Furthermore, the use of composite integral units permits the utilization of less skilled operators.

My preferred embodiment deals with a particular cam-roller design, namely a roller type contact means between the retention cam 27 and the retention arm 21. A ball bearing type roller is particularly useful in this connection, however, the use of other type rollers is not precluded. The retention arm roller 26 may be eliminated whereupon the retention arm 21 itself rubs against retention cam 27, and the same desired action is obtained. This makes for a satisfactory arrangement where the added expenses of the roller is a factor to be considered.

I claim:

1. In a container feeding apparatus for feeding containers such as bottles, vials, ampoules and the like, individually under controlled feed conditions from a side by side relationship in a gravity chute to a processing station wherein the chute is removably attached to the apparatus and is adapted to discharge a container from its lower end onto an uncovered stationary pathway whereon the container is retained by contact with a stop means positioned adjacent the pathway at a point across the pathway from the bottom of the chute and wherein a reciprocating pusher means removably attached to a reciprocating drive means is adapted to shove on its forward stroke the container along the pathway to the processing station, while simultaneously by sliding contact therewith, preventing the next container in the chute from dropping to the pathway until the return stroke of the reciprocating pusher rod is complete; the improvement which comprises, in combination, a guide member removably attached to said reciprocating drive means, said guide member describing a continuous semi-complete overhanging shelter not only for said reciprocating pusher means but also for a substantial zone in front of said reciprocating pusher means, a retention cam removably attached to said reciprocating drive means, a removably and pivotably attached retention arm, said retention arm being in continuous engagement with said retention cam, and a resilient friction means attached to said retention arm, said resilient friction means rising and falling over the lower portion of said gravity chute in timed relationship with the action of said reciprocating pusher means, the said rising occurring as said reciprocating pusher means is completing its backward stroke and the said falling occurring as said reciprocating pusher means is commencing its forward stroke.

2. The apparatus of claim 1 wherein said retention arm is removably and pivotably attached to a support means, said support means being attached to and positioned in front of the discharge end of said gravity chute and acting as said stop means.

3. The apparatus of claim 2 wherein said guide member connects said reciprocating pusher means and said reciprocating drive means.

4. The apparatus of claim 3 wherein said guide member is L-shaped and said resilient friction means is a rubber pad.

5. The apparatus of claim 1 wherein said gravity chute, said guide member, said reciprocating pusher means, said retention cam, said stop means, said removably and pivotably attached retention arm and said resilient friction means make up a composite integral unit particularly adapted to cooperate with a container of a particular diameter and height while said container of a particular diameter and height is being fed by said apparatus.

6. The apparatus of claim 4 wherein said gravity chute, said L-shaped guide member, said reciprocating pusher means, said retention cam, said stop means, said support means, said retention arm and said rubber pad make up a composite integral unit particularly adapted to cooperate with a container of a particular diameter and height while said container of a particular diameter and height is being fed by said apparatus.

References Cited in the file of this patent

UNITED STATES PATENTS

| | | |
|---|---|---|
| 583,647 | Haskins | June 1, 1897 |
| 723,602 | Guenther | Mar. 24, 1903 |
| 828,682 | Rodd | Aug. 14, 1906 |